United States Patent
Kennedy

(10) Patent No.: US 7,228,121 B2
(45) Date of Patent: Jun. 5, 2007

(54) MOBILE PHONE AMBER ALERT NOTIFICATION SYSTEM AND METHOD

(75) Inventor: Peter J. Kennedy, Durham, NC (US)

(73) Assignee: Sony Ericsson Mobile Communications AB (SE)

(*) Notice: Subject to any disclaimer, the term of this patent is extended or adjusted under 35 U.S.C. 154(b) by 361 days.

(21) Appl. No.: 10/604,070

(22) Filed: Jun. 25, 2003

(65) Prior Publication Data

US 2004/0266389 A1    Dec. 30, 2004

(51) Int. Cl.
H04M 11/04 (2006.01)
H04L 29/08 (2006.01)

(52) U.S. Cl. .............................. 455/404.1; 455/412.2; 455/414.1

(58) Field of Classification Search ............. 455/404.1, 455/404.2, 412.2, 414.1, 414.3, 521
See application file for complete search history.

(56) References Cited

U.S. PATENT DOCUMENTS

| | | | | |
|---|---|---|---|---|
| 6,456,234 | B1* | 9/2002 | Johnson | 342/357.09 |
| 6,847,295 | B1* | 1/2005 | Taliaferro et al. | 340/539.13 |
| 6,895,332 | B2* | 5/2005 | King et al. | 701/213 |
| 2003/0022684 | A1* | 1/2003 | Seeger | |
| 2003/0218535 | A1* | 11/2003 | Khoshbin | |
| 2004/0103158 | A1* | 5/2004 | Vella et al. | |
| 2004/0104808 | A1* | 6/2004 | Khoshbin | |
| 2004/0152493 | A1* | 8/2004 | Phillips et al. | |
| 2004/0180683 | A1* | 9/2004 | Dennis et al. | |
| 2005/0190061 | A1* | 9/2005 | Trela | |

OTHER PUBLICATIONS

International Search Report for PCT/IB2004/000044, (Nov. 24, 2004).

Written Opinion of the International Searching Authority for PCT/IB2004/000044, (Nov. 24, 2004).

Martyn Underhill, "Child Rescue Alert" Police Federation of England and Wales, 'Online' Jan. 2003, retrieved from the linternet: URL:http://www.polfed.ort/0103child-rescue.pdf>.

(Continued)

Primary Examiner—William J. Deane, Jr.
(74) Attorney, Agent, or Firm—Moore & Van Allen PLLC; Gregory A. Stephens

(57) ABSTRACT

A text messaging based alert notification and feedback method based on the Amber Alert system used in child abduction situations is disclosed herein. A mobile subscriber receives a public service text message that was broadcast to a large number of mobile subscribers. Law enforcement working in coordination with one or more cellular carriers compose and send out the public service text message containing facts about an exigent circumstance such as a child abduction. If a subscriber possesses information and wishes to reply to the public service text message, his mobile phone automatically generates a reply message to the public service text message. The reply message contains, at a minimum, a header portion that includes a time/date stamp, an identification stamp (e.g., mobile phone number), and if possible a location stamp. The reply message also allows for the inclusion of a data portion. The data portion includes the option of attaching additional text and an audio or video attachment to the reply message. Once the reply message is fully composed it is automatically returned to the sender of the public service text message.

14 Claims, 5 Drawing Sheets

OTHER PUBLICATIONS

K. Walt, G.Acuna: "Gov. Perry announces expansion of Texas Amber Alert network" 'Online! Sep. 13, 2002, retrieved from the Internet: URL:http://www.beyondmissing.com/news/pr/2002-09-13_gov_perry/2002-09-13_gov_perry.html>.

Sony Ericsson Mobile Communications, "International Preliminary Report on Patentability", PCT/IB04/000044, dated Nov. 4, 2005.

* cited by examiner

MOBILE PHONE AMBER ALERT NOTIFICATION SYSTEM AND METHOD

BACKGROUND OF INVENTION

The Amber Alert system was initially developed in Texas to involve the public in the search for abducted children. The basic idea was to rapidly broadcast information pertaining to child abductions to a vast public audience in hopes that someone can provide a lead for investigators. Typically, information was broadcast over conventional media outlets such as television. The Amber Alert system took the process a step further by broadcasting information over a series of large electronic bulletin boards dispersed throughout the highways of Texas and other states. The original intent of the electronic bulletin boards was to inform commuters of traffic delays, weather conditions, and the like. Amber Alert added public service announcements as a type of information that can also be disseminated.

For instance, if a child has been abducted by a man in a green station wagon, this information can be rapidly broadcast to everyone driving within sight of a bulletin board. The system is effective because it targets current drivers, the segment of the public that is most likely to spot the vehicle in question. The Amber Alert message gives a phone number where anyone can report a sighting to law enforcement.

The Amber Alert system has been credited with the safe return of many abducted children. Many other states have adopted the Amber Alert system and there is pending national legislation in the United States for a federal Amber Alert system.

The present invention is designed to take the current Amber Alert system to another level by incorporating mobile phone text messaging as a means for disseminating Amber Alert messages to the public at large.

SUMMARY OF INVENTION

The present invention is a text messaging based alert notification and feedback method based on the Amber Alert system used in child abduction situations. A mobile subscriber receives a public service text message that was broadcast to a large number of mobile subscribers. Law enforcement working in coordination with one or more cellular carriers compose and send out the public service text message known as an Amber Alert message. The Amber Alert message contains facts about an exigent circumstance such as a child abduction. The message seeks a response from anyone having information that could be helpful.

If a subscriber possesses information and wishes to reply to the public service text message, his mobile phone automatically generates a reply message to the public service text message. The reply message contains, at a minimum, a header portion that includes a time/date stamp, an identification stamp (e.g., mobile phone number), and if possible a location stamp. The reply message also allows for the inclusion of a data portion. The data portion includes the option of attaching additional text and an audio or video attachment to the reply message. Once the reply message is fully composed it is automatically returned to the sender of the public service text message.

DETAILED DESCRIPTION

Implementation of a messaging system for use by mobile phones requires the cooperation and coordination of one or more mobile subscribers, and their cellular carriers along with the network infrastructure upon which they communicate. To implement a specific messaging system such as an Amber Alert system further requires the cooperation and coordination of law enforcement.

Figure 1:
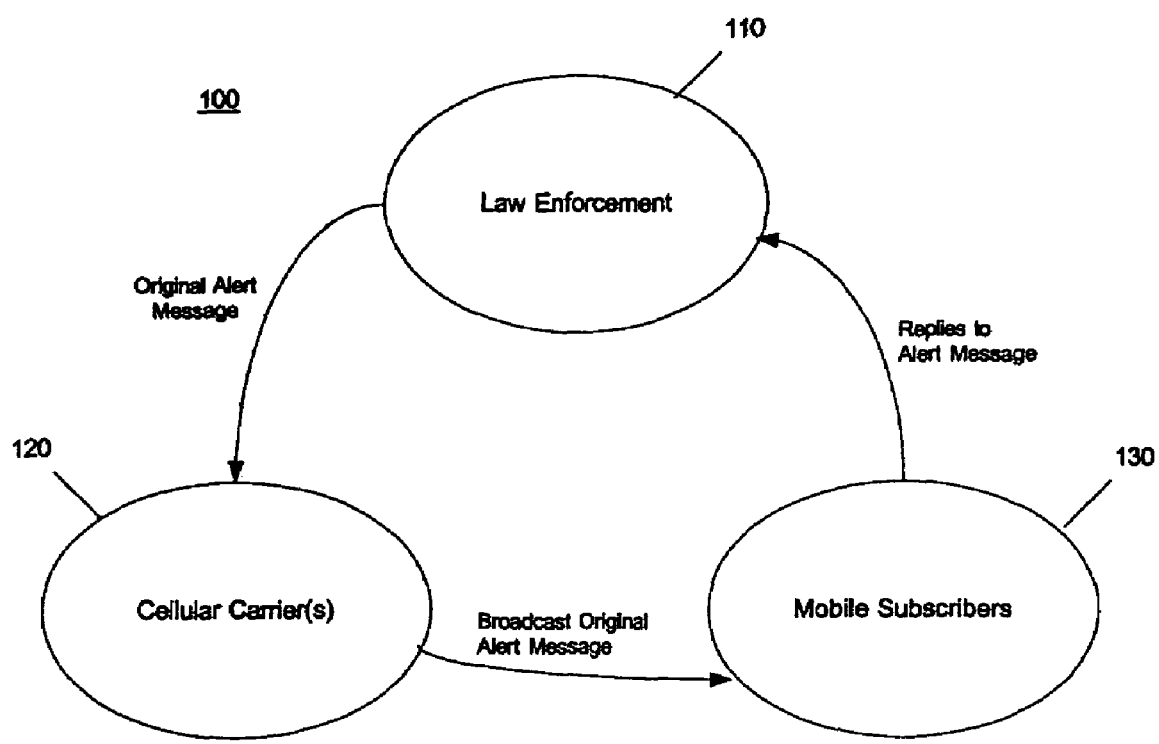
FIG. 1 is a data flow diagram illustrating the top level messaging of the present invention.

FIG. 1 illustrates the top level messaging 100 that coordinates mobile subscribers, cellular carriers, and law enforcement so that an Amber Alert system can be implemented. Law enforcement 110 is the catalyst of the system. If there is information pertaining to a child abduction to be rapidly disseminated, a message is initiated and composed by law enforcement. Law enforcement, however, does not have the resources to broadcast the message to every mobile phone in a geographic area of interest.

The only entities with broadcast resources are the cellular carriers to whom the mobiles subscribe for service. There are multiple cellular carriers that service the same geographic area. Moreover, there are multiple technology platforms that these carriers employ. Fortunately, mobile text messaging (such as SMS) has been implemented across platforms so that a single message can be sent to any mobile regardless of the technology platform it uses.

Thus, law enforcement 110 requires the cooperation of the cellular carriers 120 to broadcast an Amber Alert message to the public. The carriers obviously maintain a list of subscribers to whom they can easily broadcast text messages. Law enforcement 110 drafts and forwards a message to all of the local/regional cellular carriers 120 asking them to broadcast the message to all of their subscribers. The message is then broadcast by the carriers 120 to every mobile phone 130 capable of text messaging.

The message is received by the mobile subscriber 130 and can be acted upon accordingly. For instance, the message will likely contain instructions for replying. If a particular subscriber submits a reply to law enforcement, the information in the reply can be promptly forwarded to investigators for analysis. Presumably, the reply will contain some type of location information for a sighting. The location can be an address, a landmark, a mile marker, GPS coordinates, a heading, etc. The location information can be analyzed against other replies to look for cluster data indicating a higher likelihood of a good lead.

Figure 2:
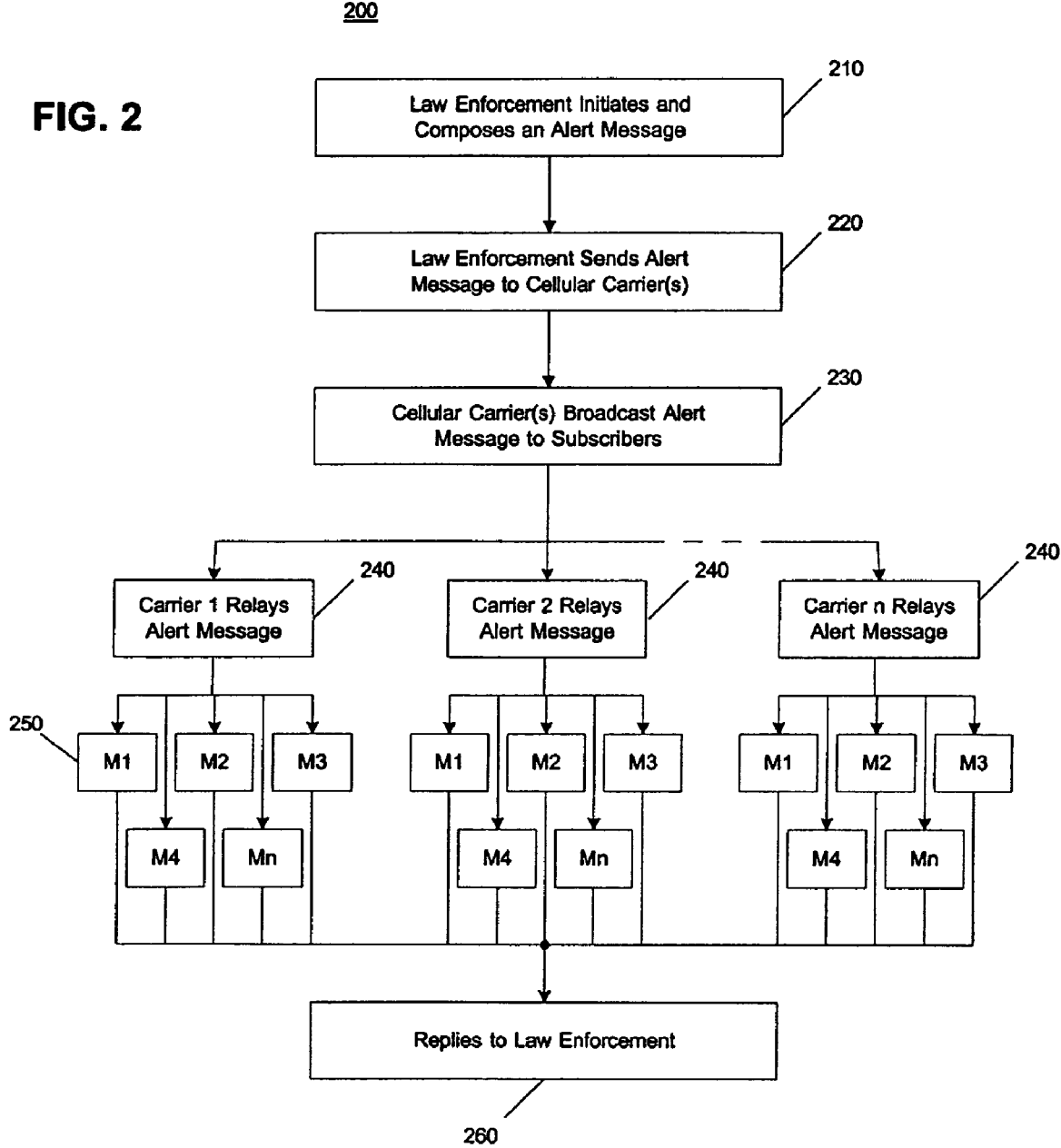
FIG. 2 is a block diagram describing the interaction among message senders and message recipients.

FIG. 2 is a block diagram 200 describing the interaction among message senders and message recipients. Law enforcement composes an alert message 210 to be publicly disseminated. The alert message pertains to a developing situation that the public may assist in solving. The alert message content describes the situation and instructions for replying. The alert message is then forwarded to as many local and regional cellular carriers 220 with an understanding that the carriers will broadcast the alert message to all of their subscribers 230. Each carrier 240 broadcasts the alert message to each of its subscribers (M1 Mn) 250. Any subscriber that wishes to reply with information can respond directly back to law enforcement 260.

Figure 3:
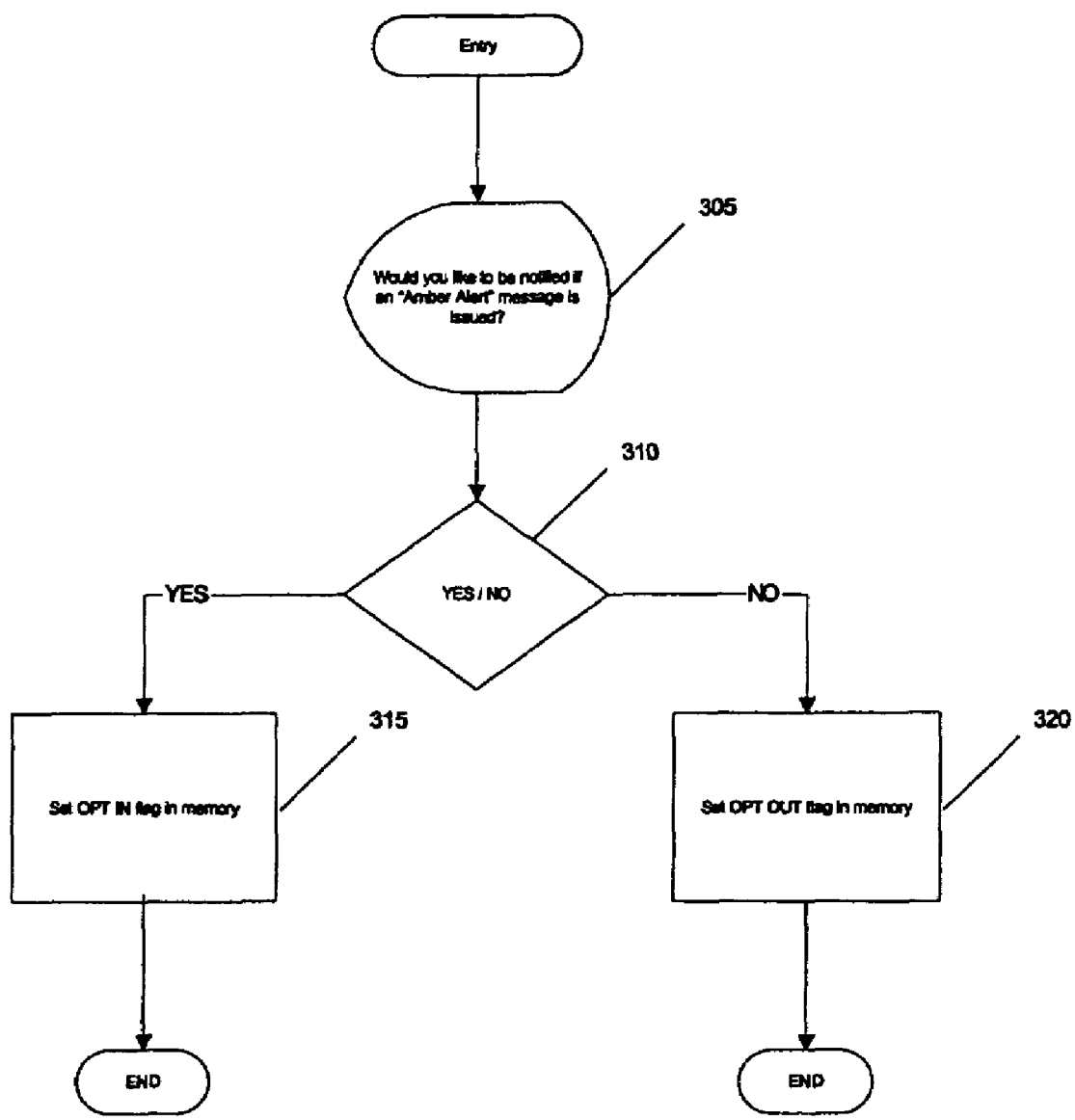
FIG. 3 is a data flow diagram illustrating an opt procedure.

FIG. 3 illustrates an opt out procedure for a mobile subscriber. Upon activation of the subscriber's mobile phone (or at some other appropriate time), the phone's display queries 305 the subscriber if they wish to participate in the Amber Alert notification system. The subscriber answers the query 310 typically with a soft key response. If the subscribers chooses to opt out an "opt in" flag is set 315 in the phone's memory and any Amber Alert messages will be passed to the subscriber. Otherwise, an "opt out" flag is set 320 in memory and Amber Alert messages will not be displayed. The opt out flag may be converted to opt in at a later date if desired by the subscriber.

Figure 4:
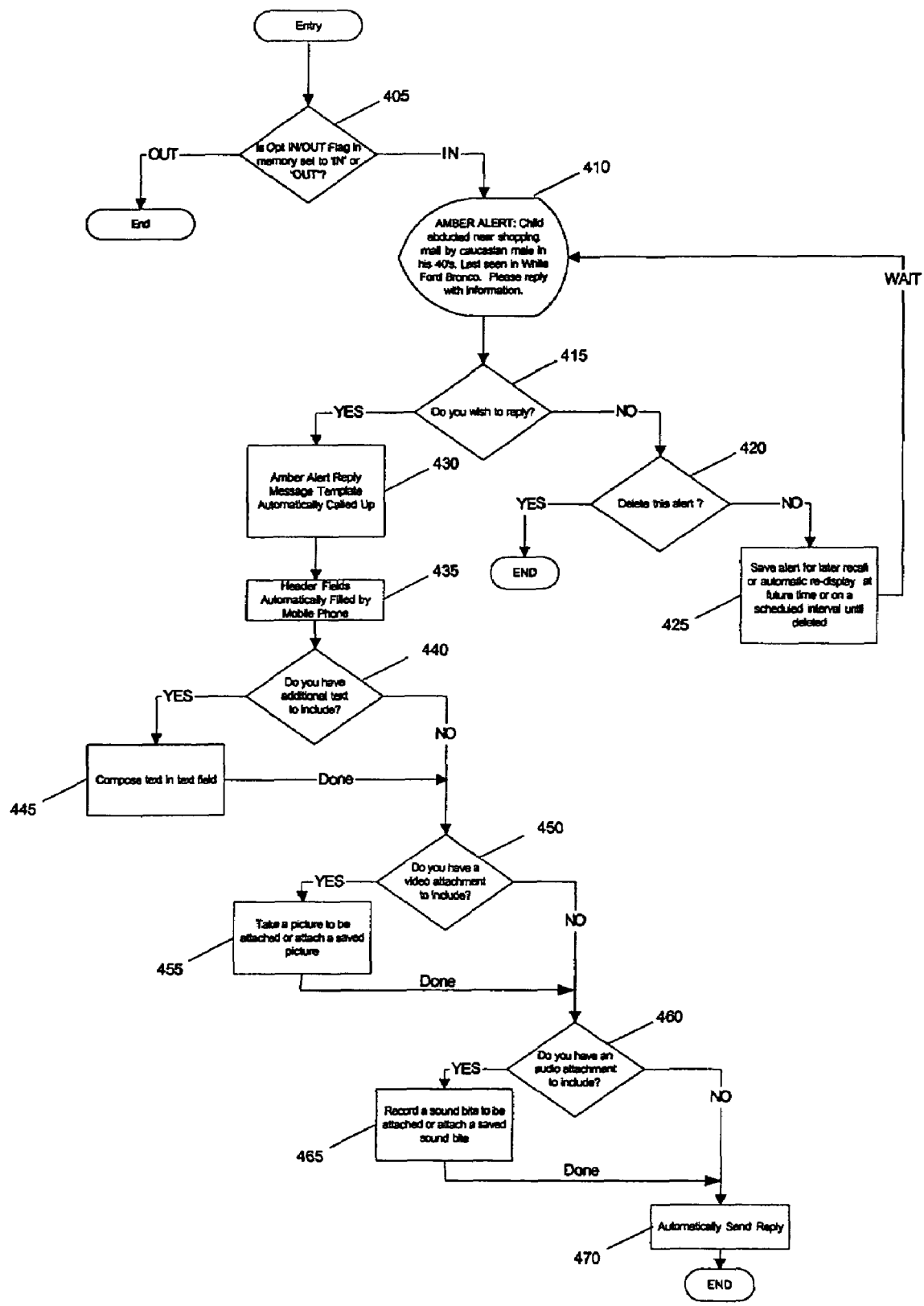
FIG. 4 is a data flow diagram illustrating the automatic reply process to an Amber Alert message.

FIG. 4 illustrates how a reply is automatically composed by a mobile subscriber. Upon receipt of an alert message, the mobile phone checks the status of the opt in/out flag 405. If the flag is set to opt out, no further processing occurs and the message is not displayed to the subscriber. If the flag is set to opt in, the Amber Alert message is displayed 410 to the user as drafted by law enforcement. The message itself will be as descriptive as possible concerning the event in The Amber Alert message contains header data identifying it as a special message that, if replied to, triggers an automatic reply message template.

The subscriber is queried if they wish to reply to the Amber Alert message 415. If the subscriber chooses not to reply, then the mobile phone asks if the Amber Alert message is to be deleted 420. If deleted, the process ends. Otherwise, the Amber Alert message is saved to memory 425 to be re-displayed on a periodic basis until it is deleted.

If the subscriber wishes to respond to an Amber Alert message, then a reply message template is automatically called up 430. The template contains header fields that are automatically filled with pertinent subscriber data 435. Once the header fields have been automatically filled, the mobile phone queries the subscriber whether they wish to text to the message 440. If so, a text editor is launched 445 and the subscriber composes a message. Next, the mobile phone queries the subscriber if they wish to include a video attachment 450 such as a picture with the reply message. If so, the subscriber can use a camera attached or integrated with the mobile phone to snap a picture 455 to assist law enforcement. Or, a picture can be called from memory and attached to the reply message. Lastly, the mobile phone queries the subscriber if they wish to include an audio attachment 460 with the reply message. If so, the subscriber can record a sound bite to be attached to the reply message or attach a previously recorded audio clip to the reply message 465. Once all the options editing the reply message have been exhausted, the message is automatically sent 470 back to law enforcement.

Figure 5:
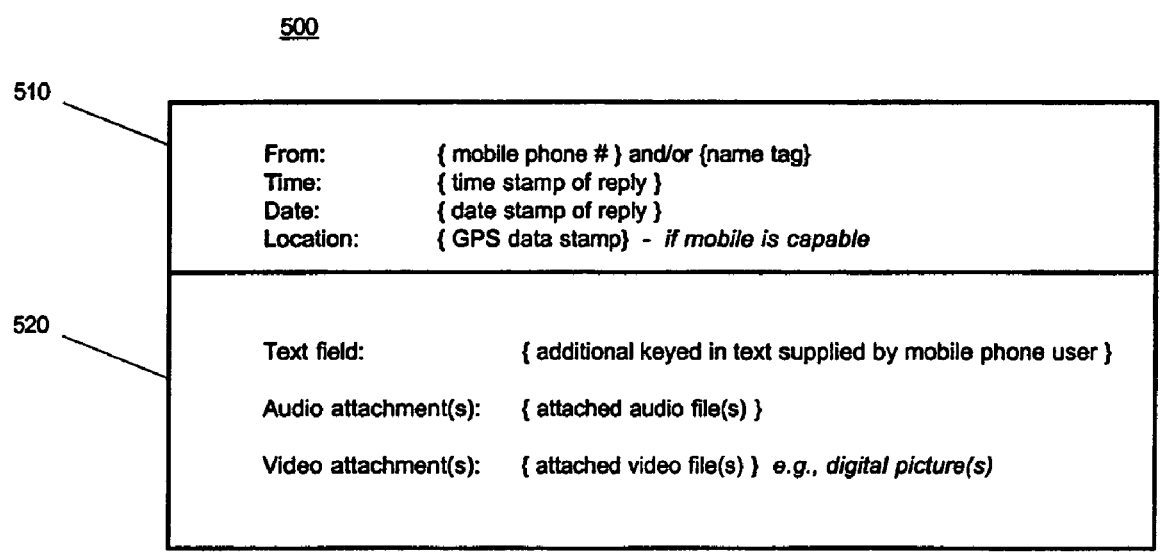
FIG. 5 illustrates sample Amber Alert message reply contents.

FIG. 5 illustrates an example of an automatic reply message 500 to an Amber Alert message. The message is split into a header portion 510 and a data portion 520. The header portion should contain, at a minimum, the phone number of the mobile subscriber making the reply. An additional name tag would also be helpful. The reply message should be date and time-stamped to give authorities a record of when the reply occurred. Perhaps most importantly, the reply should be location stamped with GPS coordinates if the mobile phone is capable. The header information can all be automatically placed into the reply message without the need for subscriber interaction. This is important because it relieves the subscriber from having to take valuable time to manually input such data and eliminates the chance of inputting erroneous data.

The header data alone provides law enforcement with extremely valuable data because it creates a context for a possible sighting. Date and time stamp provide an indication of when a suspect was spotted while the location stamp indicates where the sighting occurred. The subscriber's telephone number provides a means for contacting the subscriber for more information if necessary. Hopefully, law enforcement will receive multiple replies that can be charted. Patterns may begin to emerge from various sighting data indicating the accuracy of each reply. For instance time and place of sightings may indicate many replies are focused in the same area at the same time lending credibility to the information. This type of data can also indicate which way a suspect may be heading. Other replies may be more scattered about a map indicating less reliability.

In addition to the header information 510, a subscriber may include additional data with the reply in the form of text, a video attachment, and/or an audio attachment. Additional text in the reply could inform law enforcement that a suspect is taking an exit off a highway and heading a particular direction. An audio tag to the message could supply similar type information. If the mobile subscriber's phone has a built-in camera, he can send a photo of the environment in which the sighting occurred and perhaps even a photo of a suspect. Most important is location data. If the phone is GPS equipped, specific location data can be sent to law enforcement.

Additional reply information can prove quite valuable. It becomes even more valuable when considered with other mobile subscriber replies. Time stamped replies from multiple mobile subscribers can create a timeline and perhaps a directional heading for a suspect. The data as a whole can also weed out false sightings that may not fit in with other replies. Thus, even a simple time-stamped reply such as "I saw the suspect at the corner of Elm and Main" can convey important information to help track a suspect especially when combined with other replies to form a timeline.

While the disclosure has focused on the Amber Alert system, other law enforcement exigent situations can utilize the system and method of present invention. Situations such as a terrorist sighting, a criminal getaway, an all points bulletin (APB) can be broadcast as well. Virtually any situation where law enforcement seeks to involve the public in a manhunt type scenario can benefit from the present invention.

One of the chief advantages of the present invention is its ability to cast a very wide net since mobile phone subscribers are everywhere. Drivers, pedestrians, shoppers, restaurant goers, workers, etc. are all potential law enforcement assistants. In contrast, television alerts are only seen by those watching television. Even the original Amber Alert system is only effective for reaching drivers.

The model of the present invention is based on a single entity broadcasting an information message to a large audience and seeking responses from members of the audience. The present description has focused on law enforcement as the broadcasting entity because there are several specific situations that are readily applicable to the model. There can be other broadcasting entities that could benefit from the automatic reply model of the present invention.

The present invention can be implemented in a variety of mobile messaging settings including, but not limited to, short messaging service (SMS), multi-media messaging service (MMS), and mobile e-mail services. The messaging platform is considered independent of the automatic reply aspect of the present invention. Those of ordinary skill in the art can readily adapt the concepts set forth in the present invention to a variety of messaging platforms.

Specific embodiments of an invention are disclosed herein. One of ordinary skill in the art will readily recognize that the invention may other applications in other environments. In fact, many embodiments and implementations are possible. The following claims are in no way intended to limit the scope of the present invention to the specific embodiments described above. In addition, any recitation of means for is intended to evoke a means-plus-function reading of an element and a claim, whereas, any elements that do not specifically use the recitation means for, are not intended to be read as means-plus-function elements, even if the claim otherwise includes the word means.

The invention claimed is:

1. A text messaging based alert notification and feedback method comprising:
    in a mobile phone:
    receiving a public service text message that was broadcast to a large number of mobile subscribers;
    automatically generating a reply message to said public service text message wherein said reply message contains a header portion and a data portion; and
    automatically sending said reply message to the sender of the public service text message.

2. The method of claim 1 wherein the header portion of the reply message includes a date/time stamp identifying the time when the reply message was sent.

3. The method of claim 2 wherein the header portion of the reply message includes the mobile phone number of the mobile phone sending the reply message.

4. The method of claim 3 wherein the header portion of the reply message includes a location stamp identifying the location where the reply message was sent.

5. The method of claim 4 wherein the data portion of the reply message includes an option of attaching additional text to the reply message.

6. The method of claim 4 wherein the data portion of the reply message includes an option of attaching a video attachment to the reply message.

7. The method of claim 4 wherein the data portion of the reply message includes an option of attaching an audio attachment to the reply message.

8. A text messaging based alert notification and feedback system comprising:
    in a mobile phone:
    means for receiving a public service text message that was broadcast to a large number of mobile subscribers;
    means for automatically generating a reply message to said public service text message wherein said reply message contains a header portion and a data portion; and
    means for automatically sending said reply message to the sender of the public service text message.

9. The system of claim 8 wherein the header portion of the reply message includes a date/time stamp identifying the time when the reply message was sent.

10. The system of claim 9 wherein the header portion of the reply message includes the mobile phone number of the mobile phone sending the reply message.

11. The system of claim 10 wherein the header portion of the reply message includes a location stamp identifying the location where the reply message was sent.

12. The system of claim 11 wherein the data portion of the reply message includes an option of attaching additional text to the reply message.

13. The system of claim 11 wherein the data portion of the reply message includes an option of attaching a video attachment to the reply message.

14. The system of claim 11 wherein the data portion of the reply message includes an option of attaching an audio attachment to the reply message.

* * * * *